United States Patent [19]
Furber et al.

[11] Patent Number: 5,986,554
[45] Date of Patent: Nov. 16, 1999

[54] EMPTY PRODUCT DETECTOR

[75] Inventors: John Furber, Roseville; Mark Toetchinger, New Hope; Jim Decker, Apple Valley; Roger Keppers, St. Paul; Lee J. Monsrud, Inver Grove Heights, all of Minn.

[73] Assignee: Ecolab Inc., St. Paul, Minn.

[21] Appl. No.: 09/024,410

[22] Filed: Feb. 17, 1998

[51] Int. Cl.[6] .................................................. G08B 21/00
[52] U.S. Cl. .................. 340/623; 340/618; 200/61.2; 200/230; 73/307; 73/313
[58] Field of Search .................... 340/618, 623, 340/624, 625; 200/61.04, 61.2, 230; 73/305, 307, 309, 313

[56] References Cited

U.S. PATENT DOCUMENTS

| | | | |
|---|---|---|---|
| 3,715,539 | 2/1973 | Silberg et al. | 340/623 |
| 4,377,809 | 3/1983 | Lawford | 340/623 |
| 4,690,305 | 9/1987 | Copeland | 222/52 |
| 4,865,073 | 9/1989 | Kocher | 137/412 |
| 4,999,124 | 3/1991 | Copeland | 510/514 |
| 5,100,032 | 3/1992 | Burdorf et al. | 222/377 |
| 5,228,304 | 7/1993 | Ryan | 340/623 |

FOREIGN PATENT DOCUMENTS

| | | | |
|---|---|---|---|
| 1012630 | 6/1977 | Canada | 340/623 |

*Primary Examiner*—Jeffery A. Hofsass
*Assistant Examiner*—Van T. Trieu
*Attorney, Agent, or Firm*—Merchant & Gould P.C.

[57] ABSTRACT

The alarm mechanism of the invention signals the absence of a liquid from a source of aqueous liquid. The alarm mechanism comprises an alarm body having an inlet port and an outlet port; the inlet port in liquid communication with a source of liquid, the outlet port in liquid communication with a use locus. The alarm mechanism additionally comprises a float chamber placed in liquid parallel communication with the inlet port and the outlet port. The float chamber containing a float operably connected to an alarm. The float, when a chamber is filled with fluid, disables the switch from generating a signal. The float, as the chamber is emptied of liquid, reaches a position and is detected energizing the switch to send a "low or empty product" signal. The apparatus operates by passing liquid through the body. As liquid in the source of liquid is depleted and is no longer available for passage through the body, the body becomes emptied of liquid as the source of pressure removes liquid from the body and particularly from the chamber causing the float to reach a position generating a signal.

7 Claims, 3 Drawing Sheets

EMPTY PRODUCT DETECTOR

FIELD OF THE INVENTION

The invention relates to means for sensing depletion of a liquid supply from a source of liquid. More specifically, the invention is a reliable product empty device installed in a liquid path or in a path of liquid communication between a source of liquid and the use locus of the liquid. The liquid path typically contains a pump that drives the liquid to the use. The device is configured such that it signals "product empty" within 30 seconds of the absence of liquid from both the source of the aqueous liquid and from the means for sensing liquid absence.

BACKGROUND OF THE INVENTION

Solid block, powdered, pellet, liquid and other chemical concentrate materials can be combined with water to form a liquid concentrate solution. Such a liquid concentrate solution is pumped to a use locus such as a warewashing machine, a laundry machine, a janitorial bucket or closet sink, a clean-in-place system, as a lubricant in a conveyor and a variety of other locations where cleaners, sanitizers, rinse aids, lubricants and other liquid functional materials find utility. In such systems, the liquid concentrate is typically aqueous material is often pumped from a container or a reservoir, diluted if necessary and delivered to the use locus. The liquid in the container or reservoir is often a liquid concentrate and is purchased from a supplier, but can also be a liquid concentrate made from solid, powdered or pelletized material. Regardless of the source of the liquid concentrate, the liquid can be depleted from its container or reservoir during use. In order to obtain consistent results from the liquid concentrate, the empty container or empty reservoir condition must be made known to the staff personnel immediately for replacement with fresh liquid or a full container of liquid. Should the system no longer provide adequate concentrate to the use locus, the functionality of the material can be reduced, or lost altogether, resulting in a failure to clean, a failure to reduce microbial populations adequately, a failure to rinse, a failure to lubricate or other failure of machine or process. The presence of an insubstantial or no liquid material can result in simply a temporary reduction of function or capacity. A complete absence of function or capacity can in certain rare circumstances can result in machine damage.

A large variety of proof of flow or empty product detector mechanisms have been developed. Many such systems are complicated in construction, slow in response, or offer intermittent results. A number of low product or product empty alarm systems use floats that can be used as the empty product detectors. One such patent, Schneier, Canadian Patent No. 1,012,630, claims a low product alarm comprising a float in a hollow float chamber, a product inlet to the chamber and a product outlet from the chamber. The inlets and outlets are formed in the chamber base. The chamber includes a float and sensor switch. The chamber also comprises a second valved outlet installed in the top of the device that is used as a priming line. In use, the sensing device is filled with liquid by drawing fluid using a pump through the low product alarm, then through the valved priming line, until full. At that point, the valved priming line is closed using a valve installed in the line and operations are continued by drawing liquid from the inlet tube into the product alarm, then to the outlet, then to the pump and to the use locus. When the source of liquid is depleted, the float chamber is emptied, the float drops, triggering a product empty signal. While the Schneier device provides some degree of successful product sensing, its design is complex with multiple inlets and outlets and valved primer lines.

A substantial needs exists for a simple improved low product sensor that can provide a low product alarm with minimal complexity and maximum reliability and sensitivity.

BRIEF DISCUSSION OF THE INVENTION

The invention resides in a monolithic low product alarm apparatus formed in a solid body by introducing chambers, zones and passageways in the body. These features are preferably formed by boring the chambers, zones and passageways into a solid body. The body has an inlet port and an outlet port open to the exterior.

The inlet port and the outlet port are in liquid communication in a liquid path from a source of the liquid to a use locus. The low product alarm device of the invention can be installed at virtually any location along the liquid stream between the source and the use locus.

The outlet port can in liquid communication with a pump. The inlet port can in liquid communication with a source of functional liquid material typically a concentrate. Preferably, the inlet port of the empty product or low product alarm device of the invention is in liquid communication with a pump or other source of the aqueous liquid under pressure. In this embodiment, the outlet port of the device is then typically in liquid communication with the use locus. The absence of the aqueous liquid in the path from the pump to the use locus is then detected by the low product alarm prompting the user to replace the empty product container. We have found that the empty product detector has enhanced detection and alarm properties if placed preferably between the pump and the use locus. In such a configuration, the liquid path between the pump and the use locus comprises the detector and can comprise other dispenser components.

Within the body, the inlet port is in liquid communication with the outlet port through a passageway formed in the body. The body additionally comprises a float chamber formed in the body. The chamber and the float have dimensions that permit freedom of movement and reliable signaling from the float. Preferred floats are cylindrical in shape and are placed in a float chamber which is also cylindrical in shape. For aqueous liquids with a viscosity of less than about 250 cP, the float has a maximum lateral outside dimension of about 20 to 29 millimeters, while the chamber has a dimension of about 21 to 30 millimeters with a minimum gap of about 1 to 3 millimeters between the float exterior and the chamber wall. As viscosity increases above 250 cP, the gap between the float and the chamber wall must increase proportionally. The float chamber is placed in liquid communication with the outlet port and the inlet port, but parallel to and in liquid connection with the passageway formed in the sensor body.

In normal operation, liquid from the source of liquid passes into the threaded inlet port. The liquid passes through the passageway to the outlet port and simultaneously passes in parallel liquid communication into the float chamber. After filling the passageway and chamber, the liquid flows then to the outlet port. The direction of flow of the liquid during operation biases the float in the direction or float position of no signal. The filled float chamber maintains the float in a constant position without generating a signal until the liquid is depleted at its source. When the liquid is depleted, the pump draws the remaining liquid through the inlet port to the passageway to the outlet port. When depleted at the inlet, the withdrawal of liquid from the passageway pulls liquid from float chamber. The motion of the liquid from the chamber caused by gravity and flow, biases the float to move from the full position to an empty position. The float motion bottoming out in the chamber is detected and a product "low" or "empty" signal is generated. When no fluid is present at the inlet port, the pump empties the float chamber. The float chamber liquid flows from the bottom of the float chamber to the passageway, then to the outlet port. As the float chamber is emptied by the pump, the float drops in the float chamber to a position that signals product empty. The simple and elegant design of the sensor requires no priming circuit nor primer valuing and is simple and rugged. The sensor provides a reliable liquid empty signal within 30 seconds, preferably within 10 seconds of consuming liquid from the liquid container or reservoir.

For the purpose of this patent application, the term "parallel" means that within the body of the sensor, liquid can take one of two paths from the inlet to the outlet. The liquid can either follow the passageway from the inlet to the outlet or can flow through the float chamber from the inlet to the outlet. These two flow paths are separate and distinct but begin and end at the same passageway location. In installations using the low product detector of the invention, the detector is typically inserted between the source of liquid and the pump and requires no separate bleeding system or valuing system for its operation. It is to be clearly understood, however, that the pump may be valved or the source may be valved for supply control purposes. Monolithic means the chambers, passageways, inlets and outlets of the device are formed in a body by boring or drilling material from the body.

DETAILED DESCRIPTION OF THE INVENTION

Figure 1:
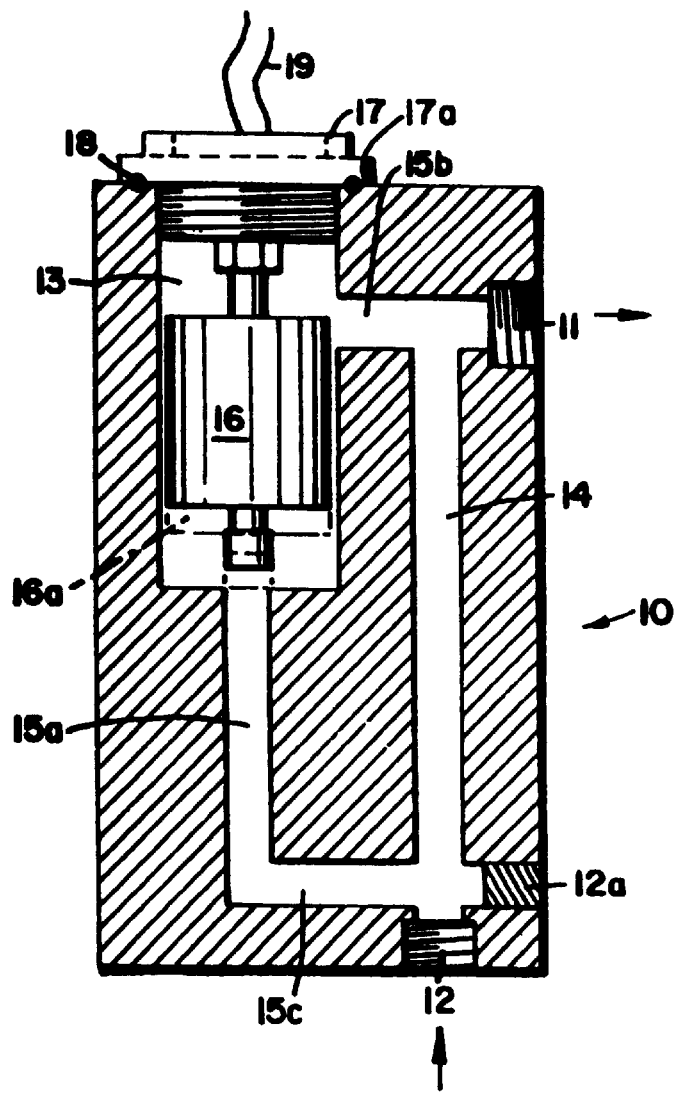
FIG. 1 is a first embodiment of the invention showing a simple design having a single inlet 12, a single outlet 11, a float chamber 13 and passages 14, 15a and 15b in parallel liquid communication.

The liquid product empty sensor device of the invention can be used with virtually any functional liquid material pumped or otherwise directed to virtually any useful machine, place, container or locus. The liquids can be aqueous or non-aqueous liquids. The functionality of liquids can be broad. Such functionality can include laundry detergents, warewashing detergents, surface sanitizers, hard surface cleaners, lubricants, rinse agents, etc. The low product alarm of the invention is designed for use with liquids that have viscosities not substantially greater than water. Such viscosities can be less than about to 300 cP, preferably range from about 1 to 250 cP at 23° C. using a Brookfield viscometer with a No. 3 spindle at about 10 to 50 rpm.

The use loci common for the low product alarm of this invention include laundry machines, warewashing machines, conveyor lines, bottle conveyor lines, two liter beverage container conveyor lines, clean-in-place system apparatus, dairy plant sanitizers, and any other uses involving dispensing a liquid with a pump to a use locus. Clearly any use locus that can use a functional liquid material of the sort disclosed in this invention can find use from the low product sensor of the invention. The low product sensor is typically installed in a liquid stream between a source of liquid and its use. The pump draws the source of liquid and directs it to its use locus until the liquid is depleted from the container or reservoir. The low product sensor of the invention is typically installed between the source of liquid, a container or reservoir and the pump and generates a "product empty signal" when the liquid is depleted. The product empty signal can be any type of communication including visual signals, aural signals, etc. The preferred signals include warning lights, loud alarms, sirens, klaxons, etc.

The empty product detector apparatus of the invention is designed to be used with liquid compositions pumped to a use locus. The liquids are either dilute solutions or concentrates. Typical concentrates or dilute use solutions include liquid detergents, liquid rinse aids, liquid sanitizer materials and other functional aqueous liquids that can be used to clean, sanitize, bleach, rinse, etc. Liquid detergent compositions typically comprise in an aqueous base, at least one surfactant, a sequestrant, an optional solvent, an optional acid or basic component, and a variety of other additive materials such as dyes, perfumes, etc. Surfactants useful in liquid detergents are typically anionic or nonionic foaming or low foaming surfactants. Sequestrants are commonly organic or inorganic sequestrants that can treat typical service water to reduce the anti-detergent properties of hardness ions. Typical solvents can be used in the liquid detergents including lower alcohols, hydrocarbons, chlorofluorocarbons, ether alcohol solvents, etc. Such detergents can be manufactured in a concentrate or in a dilute material. In concentrates, the active ingredients can total up to 35 to 75 wt % of the concentrate while in a dilute material, the active components are typically less than 10% of the total material.

The empty detector of the invention can also be used with aqueous rinse aid concentrates or diluted rinse aid materials. Rinse aids are typically aqueous solutions of nonionic surfactants or similar sheeting promoting components that cause clean ware, after a cleaning cycle, to rinse completely leaving no spots or streaks from dried rinse residue. Such rinse aids typically comprise a nonionic surfactant typically manufactured to enhance rinsing properties. The rinse aids can also contain other surfactant materials, sanitizing materials, and other materials that do not tend to cause the formation of streaks and spots.

An aqueous sanitizer can also be used with the compositions of the invention. Sanitizers are typically antimicrobial materials that can substantially reduce microbial populations on typically hard surfaces. The sanitizer material is used by diluting the sanitizer material with water and contacting the surface for a sufficient period of time, typically greater than 30 seconds, typically less than about 30 minutes in order to control microbial populations. A variety of sanitizer materials can be used. Chlorine based sanitizers comprising hypochlorite, chlorine, chlorine dioxide can be used. Further, peracid materials such as peracetic acid, perpropionic acid, perglutaric acid, peroctanoic acid, etc. can be used. Further, organic sanitizers can be used such as chlorhexadene, iodophor, hexachlorophene, etc. In all these cases, the material used in the product out sensor can either be a concentrate or a fully dilute use solution.

The preferred mode of the dispenser is used with dilute materials having a viscosity not substantially greater than water. The internal passages, the clearance between the float and the float chamber are calibrated for dilute aqueous solutions. If thicker solutions are used, the dimensions of the passages must be increased proportionally with an increase in viscosity. Typically the use solutions of the invention have a viscosity that ranges from about the viscosity of water to about 500 cP, alternately from about the viscosity of water to about 250 cP, at 23° C. using an RTV Brookfield viscometer, a No. 3 spindle at 20–50 rpm.

The nature of the invention will be further understood with reference to the drawings. FIG. 1 shows a first embodiment of the invention. The sensor body 10 is shown generally. The sensor body has a threaded inlet port 12 and a threaded outlet port 11. The inlet port 12 is typically directly in liquid communication with a source of liquid in a reservoir or container. The preferred means of liquid communication are flexible tubes (not shown) having an internal diameter of about 1.5 to 10 millimeters preferably about 1.6 to 6 millimeters. The outlet port 11 is in liquid communication with typically a pump (not shown) through a similar tube (not shown). The pump output directed to a use locus. Threaded inlet port 12 and threaded outlet port 11 are connected with a passageway 14 formed in the body of the sensor. The passageway is typically a circular bored or drilled passageway having a diameter of about 27 to 29 millimeters. The sensor body also contains a float chamber 13 containing a float 16. The float chamber is in parallel liquid communication with the passageway from threaded inlet port and threaded outlet port. Threaded inlet port is connected to the float chamber using passageway 15a and the float chamber is in liquid communication with the threaded outlet port using passageway 15b. Float is placed in the chamber with a degree of vertical travel permitted in the float chamber. Float shows the maximum vertical position of the float with a filled chamber. The float, in phantom, shows the minimum vertical position 16a of the float in an empty chamber. This position is detected and signals a product empty condition. The preferred float is a cylindrical float and the preferred chamber is a cylindrical chamber. The bore of the chamber is typically about 27 to 29 millimeters while the external diameter of the float is typically 25 to 26 millimeters. The extent of travel of the float from position at 16 to position at 16a within the chamber is typically less than about 15 millimeters preferably less than 11 millimeters and typically is in the range of about 5 to 15 millimeters. A minimum movement of about 5 millimeters from an upper position in the float chamber to a lower position in the float chamber is sufficient to generate a product empty signal. The float chamber 13 and the passageways in the body are typically formed by boring the cylindrical float chamber has a diameter of about 27 to 29 millimeters formed directly into the body of the sensor. The float 16 and sensor assembly 17 is then inserted into the chamber and is sealed on seat 17a using a threaded seal using o-ring 18 inserts to complete a liquid proof seal. The sensor is connected to an alarm comprising a visible or audible alarm using wires 19.

When placed in service, a pump (not shown) draws liquid from a source of liquid into the inlet port. The pump can be installed upstream or downstream from the empty product sensor device. In other words, the pump can drive the liquid into the inlet or can pull the liquid from the outlet in supplying the liquid to the use locus. Preferably the pump is installed between the device and the use locus and drives the liquid through the device by drawing the product from the outlet.

Liquid fills the inlet, fills chamber and then the passageways. When the chamber and passageways are filled with liquid, the liquid passes out outlet port to the pump and then to the use locus. When liquid fills chamber, the float is moved or raised from an empty position 16a (in phantom) to a filled position and any empty product alarm is turned off. While liquid is present from the source at inlet port 12, the float remains at position 16 with no signal being generated. When liquid is depleted at the source, liquid is pulled by the pump from outlet port 11. As the liquid is depleted, liquid is drawn from passageway and chamber through passageway into passageway and then out outlet to the pump. This liquid movement facilitates or biases the movement of the float from "full product" position 16 to "empty product" position 16a. Such liquid flow empties the chamber from the bottom of the chamber through passageway 15a. Because of this liquid movement, the float tends to be drawn toward the empty position 16a. When reaching the empty position 16a, the float generates a product empty signal in switch assembly 17 which is directed to the visual or audible signal means through wires 19. Plug 12a is shown closing a portion of a passageway 15a formed by drilling or boring the sensor body 10. The bore plug is used to close the passageway at a location not needed for operation of the sensor.

Figure 2:
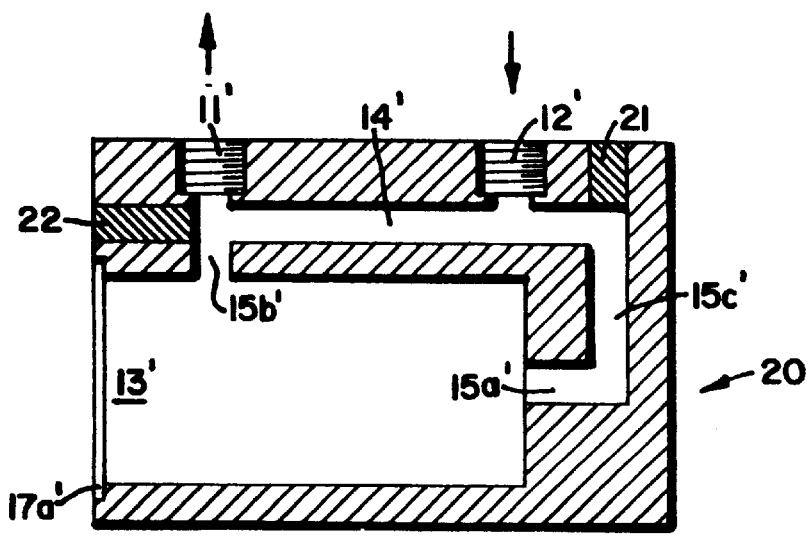
FIG. 2 is a second embodiment of the invention showing a different embodiment of the internal passages.

FIG. 2 is an alternate embodiment of the invention having similar operation with an alternate formation. FIG. 2 shows a sensor body 20 having a float chamber 13'. Installed in the float chamber at seat 17a' is the sensor device and float (not shown). Also formed in the device are inlet 12' and outlet 11'. Inlet 12' is typically directly in liquid communication with a source of liquid typically a pump outlet. Outlet port 11' is typically in liquid communication with a use locus where the properties of the liquid material are utilized for some beneficial purpose. Plugs 21 and 22 are introduced into bored holes in the body to seal bore holes not needed for the operation of the sensor device.

In the manufacture of the device 20 in FIG. 2, initial borings are made to form the sensor cavity 13' followed by passageway 14'. Then initial borings are introduced into the sensor body at inlet port 12', passageways 15b',15c' and outlet port 11' followed by second borings increasing the diameter of the inlet port 12' and outlet port 11'. Alternately, passageway 14' and passageway 15a' are connected by passageway 15c' that is introduced into the sensor body through initial boring now plugged by plug 21. Lastly, passageway 14' is introduced into the sensor body by boring into the sensor body at the point now sealed by plug 22. In such a way, the cooperating inlet, outlet, passageway, and sensor cavity can be conveniently formed in the body by linear boring operations.

Figure 3:
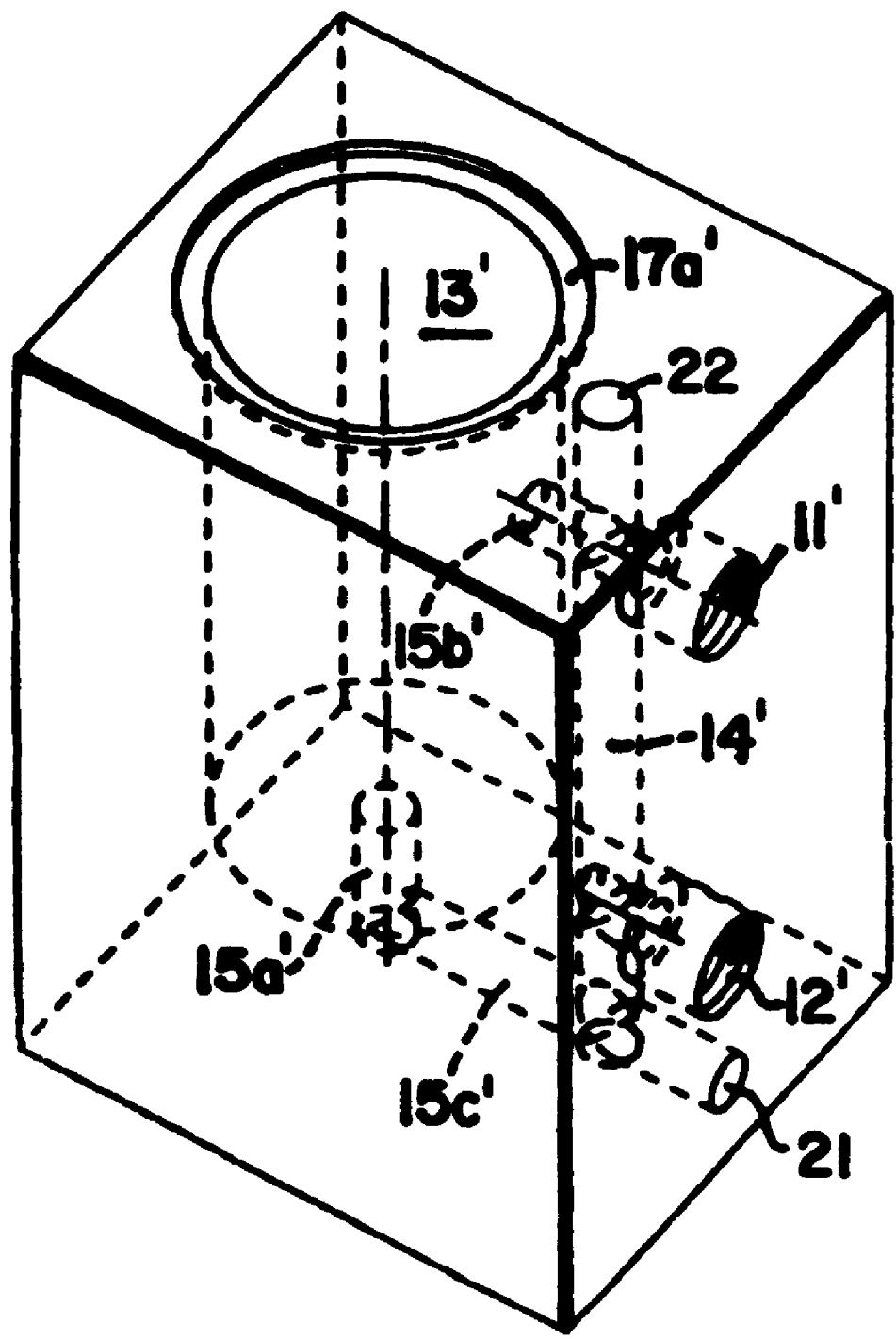
FIG. 3 is an isometric drawing of the device of FIG. 2 disclosing the borings needed to make the device.

FIG. 3 is an isometric drawing of the device of FIG. 2. In FIG. 3 the confirmation of the board chamber and passageways in the sensor device are clearly shown. Passageway 15a' is formed in the center of the sensor chamber 13'. Inlet port 12' and outlet port 11' are centered on the side of the cylindrical sensor cavity 13'. Passageway 14' is parallel to and centered on the sensor cavity 13'. The rectangular prism used to form the sensor device body has dimensions of 1.75 inches in width, 2 inches in depth and approximately 3 inches in height. The diameter of the sensor chamber is about 1.062 inches. The width of seat 17a' in FIG. 2 is about 1.25 inches. The internal passages 15a', 15b', 15c' and 14' are about 0.187 inch. The inlet port 12' and outlet port 11' are overdrilled to a size of about 0.339 inch for the introduction of a tapped surface. These dimensions are established for relatively low viscosity aqueous liquids. As the viscosity of the liquids are increased, the dimensions of the passages are proportionately increased to permit substantially constant flow velocity.

Figure 4:
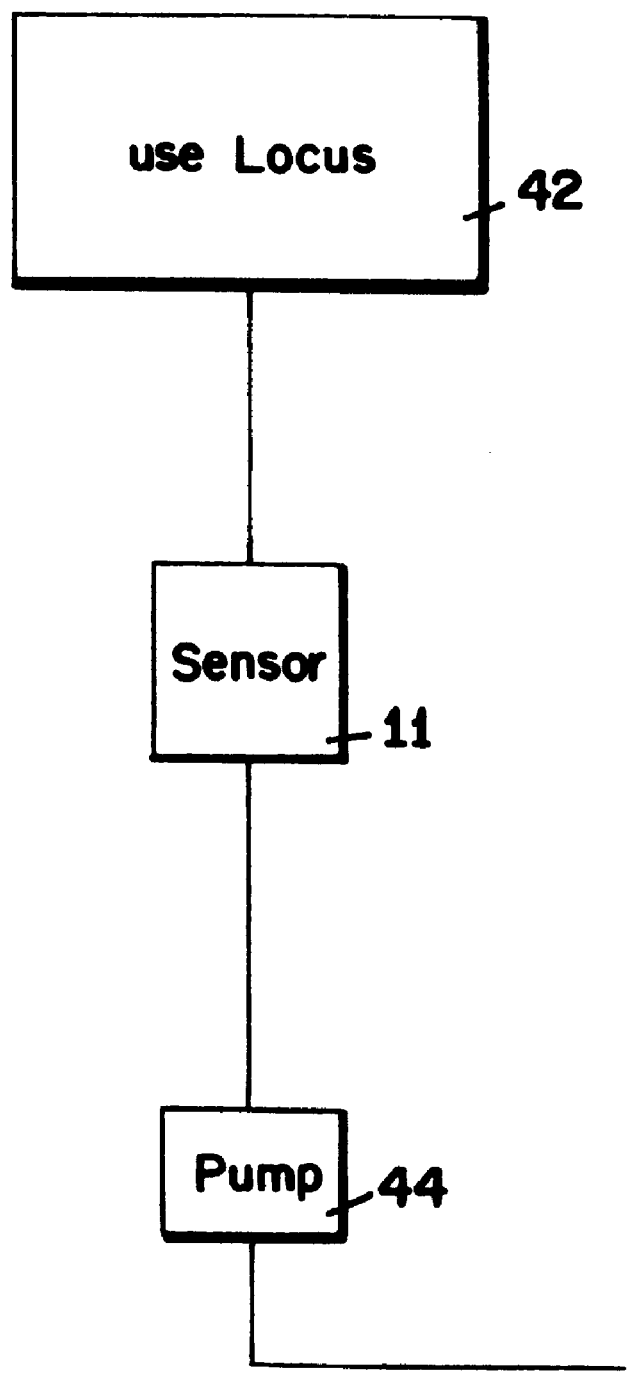
FIG. 4 is a schematic view of a dispenser according to the invention.

Another embodiment of the invention is shown in FIG. 4. This is a schematic illustration of a dispenser 40 in which a sensor 10 is placed in liquid communication with a use locus 42 and a pump 44. In this embodiment, the use locus 42 can include laundry machines, warewashing machines, conveyor lines, bottle conveyor lines, two liter beverage container conveyor lines, clean-in-place system apparatus, dairy plant sanitizers, and any other uses involving dispensing a liquid with a pump to a use locus. The sensor 10 is as described previously. The pump 44 can be of any suitable type and size for the particular application.

The position of the float can be sensed or detected in a number of ways. The float position can be detected using an infrared beam. The float moving to a position that blocks the beam. The beam blockage interrupting the beam causing a sensor to detect the absence of optical energy triggering a signal. Further, the float can have an electrical contact positioned at any position of the float. Such a contact can be on the float sides, the float end, or the float can be connected with a switch positioned in the connector or seal with the body. Further, the float can contain a magnet which when it reaches a position showing the absence of liquid, can attract a magnet switch which can also generate a signal. In the preferred embodiment float 16 (FIG. 1) is connected mechanically to a sensor assembly 17 containing a switch (not shown) that is energized by the motion of the float 16. The switch can either connect a source of power to a sensor or interrupt the flow of electricity as the float moves to an "empty" position.

The float and float chamber in FIG. 2 are similar to that in FIG. 1 in chamber bore, float diameter and are identical in float signal operation. We have found that the above sensor apparatus is reliable and produces a product empty alarm within 30 seconds, preferably within 10 seconds, of the absence of liquid at inlet port. These results were obtained while operating the sensor at a liquid flow rate of about 50 to 200 mL-min$^{-1}$ (milliliters per minute) with an aqueous solution having a viscosity of about 1 to 250 cP at about 23° C. At these conditions, the pump pulls liquid from the float chamber causing the float to move to a position that signals an empty condition reliably without a false "filled" signal occurring. Further, the geometry of the apparatus prevents the occurrence of any false "out" signal. This embodiment of a product out sensor can be used without a priming line and without a prime line valve.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An alarm apparatus that can signal an absence of liquid quickly and reliably, the alarm comprising:

(a) a monolithic alarm body;

(b) an outlet formed in the monolithic alarm body in fluid communication with a pump;

(c) an inlet port formed in the monolithic alarm body in liquid communication with a source of liquid, the inlet port in liquid communication with the outlet through a liquid path formed in the body; and (d) a float chamber formed in the monolithic alarm body, having a float operably connected to a means to signal the absence of the liquid, the float chamber in parallel liquid communication with the liquid path;

wherein under the condition of the absence of liquid at the inlet port, the pump draws liquid from the float chamber and the liquid path causing the float to move to a position signaling the absence of liquid in the alarm body.

2. The apparatus of claim 1 wherein the float and float chamber are cylindrical and a clearance between the float and the float chamber is about 2 millimeters.

3. The apparatus of claim 1 wherein the liquid path and the passages formed in the body have a diameter of about 1.6 to 6 millimeters.

4. The apparatus of claim 1 wherein the means to signal the absence of the liquid comprises an electric switch.

5. The apparatus of claim 1 wherein the liquid flows through the outlet at a rate of about 50 to 150 mL-min$^{-1}$.

6. A dispenser comprising a source of an aqueous concentrate or use solution, a pump, a use locus, and an alarm apparatus that can signal an absence of liquid quickly and reliably, the alarm comprising:

(a) a monolithic alarm body;

(b) an outlet formed in the monolithic alarm body in fluid communication with a pump;

(c) an inlet port formed in the monolithic alarm body in liquid communication with a source of liquid, the inlet port in liquid communication with the outlet through a liquid path formed in the body; and (d) a float chamber formed in the monolithic alarm body, having a float operably connected to a means to signal the absence of the liquid, the float chamber in parallel liquid communication with the liquid path;

wherein under the condition of the absence of liquid at the inlet port, the pump draws liquid from the float chamber and the liquid path causing the float to move to a position signaling the absence of liquid in the alarm body.

7. The dispenser of claim 6 wherein the outlet of the pump is in liquid communication with the inlet to the alarm apparatus.

* * * * *